March 21, 1950   F. E. GILMORE   2,501,326
AMMONIA DISTILLATION SYSTEM
Filed July 19, 1945   2 Sheets-Sheet 1

INVENTOR.
FORREST E. GILMORE
BY
Kenyon & Kenyon
ATTORNEYS

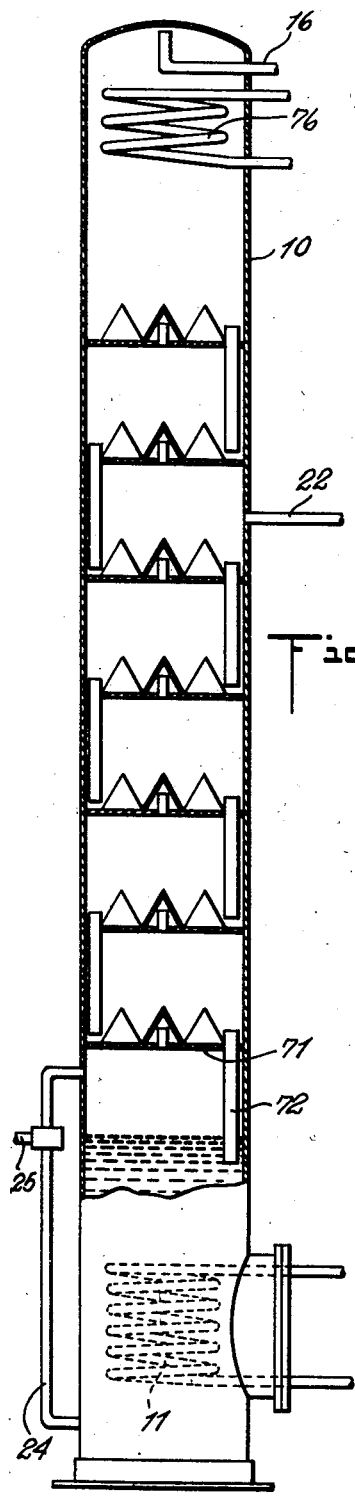
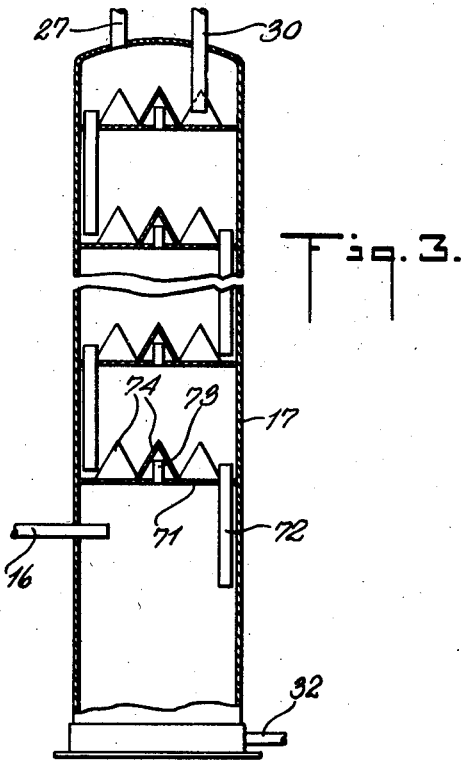
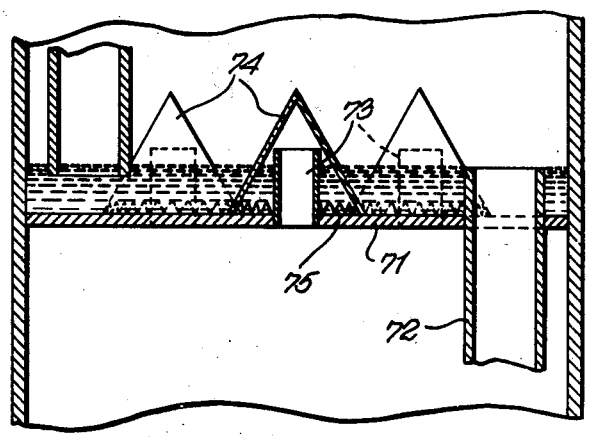

Patented Mar. 21, 1950

2,501,326

UNITED STATES PATENT OFFICE 2,501,326

AMMONIA DISTILLATION SYSTEM

Forrest E. Gilmore, Bartlesville, Okla., assignor, by mesne assignments, to Frigid Transport Company, Inc., New York, N. Y., a corporation of New York Application July 19, 1945, Serial No. 605,901

1 Claim. (Cl. 202—40)

This invention relates to a system of refrigeration for use in conjunction with mobile transportation units.

It has heretofore been proposed to provide each of a plurality of transportation units such as automobile trucks or railway cars, both passenger and freight, with only the evaporator or cooling unit and the absorber of an absorption refrigeration system. Then, at various strategic locations in the area being covered by the transportation units, whether for a city, a state, or a nation, there are located central supply or service stations where periodically the transportation units will come to have the absorbers emptied and the evaporator and absorbers recharged. Thereafter, either at the service station or at still other strategically located points, the drained contents of the absorbers are passed through the recovery apparatus of the system whereby the refrigerant and absorbent are recovered and each stored ready for recharging transportation units.

In operating such a system, it has been found desirable especially where a number of shippers use the same transportation units which are being serviced from a plurality of different recovery plants or service stations, to so operate the system as a whole that refrigerant of a predetermined quality and absorbent of a predetermined quality, always are furnished to the transportation units. This arrangement keeps the system in balance insofar as refrigerant and absorbent are concerned. The higher the quality of refrigerant, the better the system operates and the present invention contemplates the use of refrigerant that is at least 99% pure and also a recovery system operating economically and efficiently.

It is one object of this invention to provide improved arrangements for separating refrigerant from absorbent and recovering both.

In the present refrigerating system, ammonia is the refrigerant and water is the absorbent so that when the absorbers of a transportation unit are emptied, they are emptied of water combined with the spent ammonia, this being known in the art as strong liquor or strong aqua-ammonia. When this strong aqua-ammonia is passed through a generator at the service station, ammonia vapor is separated from the water content and becomes anhydrous ammonia ready for recharging the evaporator. The residue in the generator is known in the art as weak liquor or weak aqua ammonia consisting of water with a very slight content of ammonia. The weak liquor stored and thereafter used is the absorbent in recharging the transportation units.

Other objects, novel features and advantages of this invention will become apparent from the following specification and accompanying drawings, wherein:

Fig. 2 is an elevation partly in section of the generator forming part of the system;

Fig. 3 is a similar view of the dehydrator forming part of the system, and

Fig. 4 is an enlarged fragmentary vertical section of either the generator or dehydrator.

Figure 1:
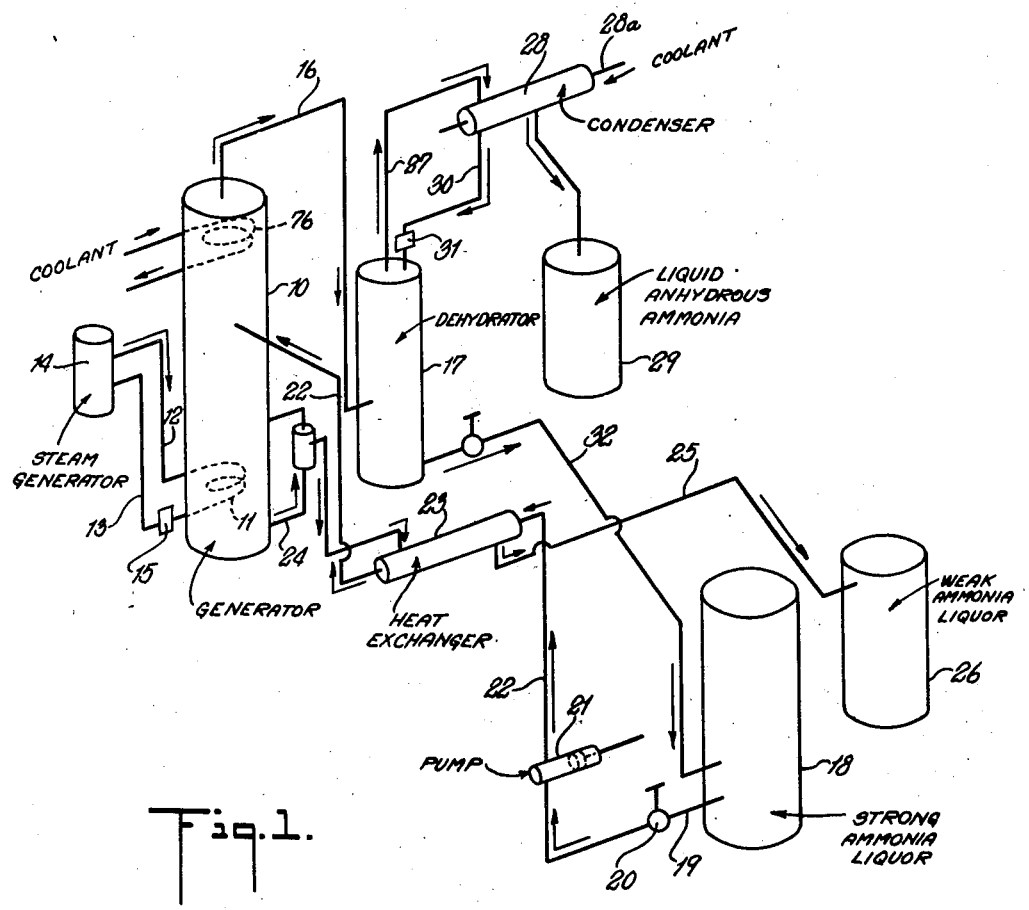
Fig. 1 is a schematic view of a system embodying the invention.

The generator 10 comprises a vertical generally cylindrical tank in the bottom of which is arranged a heating coil 11, the opposite ends of which are connected through pipes 12 and 13 with a heater 14 which produces steam for circulation through the coil. A standard steam trap 15 is provided in the pipe 14. The generator 10 is in the nature of a bubble tower, the specific structure of which will be later described in detail in connection with Figs. 2 and 4. A pipe 16 leads from the top of the generator 10 to an intermediate point in a dehydrator comprising a vertical cylindrical tank 17 also in the nature of a bubble tower and the specific details of which will later be described.

A storage tank 18 for strong liquor has a pipe 19 leading from the lower portion of the tank through a manually operated valve 20 to the inlet of a pump 21, the outlet of which is connected by a pipe 22 through one passageway of a heat exchanger 23 to the generator 10 at a point approximately two-thirds of its height. A pipe 24 communicates with the tank 10 at two different elevations and includes a steam trap which is connected by a pipe 25 through the remaining passageway of the heat exchanger 23 to a storage tank 26 for weak liquor.

The top of the dehydrator 17 is connected by a pipe 27 through a condenser 28 to a storage tank 29 for liquid anhydrous ammonia and coolant is circulated through the condenser by the pipe 28a. A pipe 30 leads from the condenser 28 through a drip valve 31 to the dehydrator 17. A valve-controlled pipe 32 leads from the bottom of the dehydrator 17 to the tank 18.

The generator 10 is equipped with a plurality of trays 71, each of which supports a tube 72 projecting a slight distance above the top surface of the tray 71, and also projecting a considerable distance below the bottom surface. Each tray 71 also supports a plurality of tubes 73, each projecting above the tray 71 to a greater height than the tube 72. The tubes 72 of each tray 71 except the bottom one, extend downwardly below the level of the tops of the tubes 73 of the next lower tray. Each tube 73 is covered by a cone-shaped cap 74 having at its rim serrations 75 of less height than the height of the tube 72 above the tray 71. The lowermost tube 72 projects below the level of the liquid in the generator. In the top of the generator there is provided a coil 76 through which a coolant is circulated.

Weak liquor or weak aqua-ammonia is contained in the lower portion of the generator 10 and strong liquor or strong aqua-ammonia is supplied by the pump 21 to the generator 10 from the storage tank 18 through the pipes 19, 22 and 25 at a point such that the majority of the trays 71 are below the point of liquor introduction. The weak liquor in the bottom of the generator is heated above vaporization temperature by the passage of steam through the coil 11 and the vapor thus produced is utilized for removing ammonia from the strong liquor introduced through the pipe 25.

During operation of the generator, each tray 71 supports a body of liquid equal in height to the extent of the tube 72 above the tray 71, the liquid being aqua-ammonia of progressively increasing strength in the succession of trays upwardly. The vapor emanating from the body of weak liquor in the bottom of the generator passes upwardly through the tubes 73 of successive trays 71 into the caps 74 and is forced to escape from the caps 74 through the serrations 75 and consequently passes through the body of liquid supported by each tray 71. In the passage of the water vapor through the lowermost tray, the vapor gives up some of its heat to the liquid in the tray and vaporizes some of the ammonia in the liquid with concurrent condensation of a portion of the water vapor. The mixture of the remaining water vapor and ammonia vapor passes upwardly to the next tray in which a similar effect takes place while the condensate remains in the tray. The overflow from each tray 71 passes downwardly through successive tubes 72 to the lower portion of the generator 10. By reason of the fact that the vapor is at its highest temperature upon passage through the lowest tray 71 and decreases as it passes through successive trays, its vaporizing effect decreases as it passes upwardly and the liquid in the trays 71 progressively increases in ammonia content. The coil 76 serves to remove superheat from the vapor stream and to supply condensed strong liquor to the top tray.

The vapor stream passes from the top of the generator 10 through the pipe 16 to the dehydrator 17 below the bottom tray 71 therein. Anhydrous liquid ammonia is supplied from the condenser 28 through the pipe 30 and drip valve 31 to the dehydrator 17 above the top tray 71. As described in connection with the generator 10, each tray 71 supports a body of liquid through which vapor passes successively by way of the tubes 73 and caps 74. The liquid contained in the dehydrator trays either is anhydrous liquid ammonia or liquid ammonia slightly diluted with water and absorbs from the vapor passing therethrough all traces of water vapor so that anhydrous ammonia vapor passes out of the dehydrator 17 by way of the pipe 27 to the condenser 28 in which it is liquefied by cooling. The overflow from the various trays passes downwardly through the tubes 72 to the bottom of the dehydrator from which it is periodically drained through the pipe 32 to the storage tank 18.

Weak liquor is drained from the bottom of the generator 10 through the pipe 24 and heat exchanger 23 to the storage tank 26. The hot weak liquor in its passage through the heat exchanger 23 preheats the strong liquor passing through the heat exchanger to the generator. A predetermined depth of weak liquor is maintained in the bottom of the generator 10 and the escape of steam from the generator is prevented by the trap in the by-pass pipe 24.

It is of course understood that various modifications may be made in the system above described without in any way departing from the spirit of the invention as defined in the appended claim.

I claim:

A method for producing substantially anhydrous ammonia from strong ammonia liquor, including the steps of introducing heated water vapor to a first tower, introducing the strong ammonia liquor to the first tower above the location where the heated water vapor is introduced thereto, the strong ammonia liquor being introduced to the first tower below its top portion, a cooling zone in the top portion to condense water vapor from the ammonia gas therein and produce an ammonia liquor down flow therein, removing weak ammonia liquor from the lower portion of the first tower when this liquor accumulates therein and storing this liquor for use when needed, removing ammonia gas from the upper portion of the first tower when it is generated from the strong liquor and introducing this ammonia gas to a second tower, introducing substantially anhydrous liquid ammonia to the second tower above the location where the ammonia gas is introduced thereto to dehydrate the gas, removing strong ammonia liquor from the lower portion of the second tower when this liquor accumulates therein and keeping it separated from the stored weak ammonia liquor, recirculating at least a part of said strong ammonia liquor removed from the second tower and adding it to the strong ammonia liquor feed of the first tower and removing ammonia gas from the upper portion of the second tower as the desired substantially anhydrous ammonia, said substantially anhydrous ammonia gas removed from the second tower being condensed to liquid ammonia of which a portion is returned to the second tower to provide said introduction of substantially anhydrous liquid ammonia thereto and the balance is stored for use as substantially anhydrous liquid ammonia.

FORREST E. GILMORE.

REFERENCES CITED

The following references are of record in the file of this patent:

UNITED STATES PATENTS

| Number | Name | Date |
| --- | --- | --- |
| 671,810 | Thurstensen | Apr. 9, 1901 |
| 1,012,272 | Pennock et al. | Dec. 19, 1911 |
| 1,702,495 | Clapp | Feb. 19, 1929 |
| 1,872,829 | Shoeld | Aug. 23, 1932 |
| 2,012,621 | Bennett | Aug. 27, 1935 |
| 2,080,167 | DaValle | May 11, 1937 |
| 2,108,914 | Bennett | Feb. 22, 1938 |
| 2,151,935 | Petroe | Mar. 28, 1939 |
| 2,180,231 | Geertz et al. | Nov. 14, 1939 |

FOREIGN PATENTS

| Number | Country | Date |
| --- | --- | --- |
| 132,504 | Great Britain | Sept. 1, 1919 |
| 455,947 | Great Britain | Oct. 30, 1936 |